(12) United States Patent
Gao et al.

(10) Patent No.: US 11,822,082 B2
(45) Date of Patent: Nov. 21, 2023

(54) AR DISPLAY METHOD, APPARATUS AND DEVICE PROVIDED MICRO MIRROR ARRAY

(71) Applicant: GOER OPTICAL TECHNOLOGY CO., LTD., Weifang (CN)

(72) Inventors: Zhenyu Gao, Qingdao (CN); Dongfeng Zhao, Qingdao (CN)

(73) Assignee: GOER OPTICAL TECHNOLOGY CO., LTD., Weifang (CN)

( * ) Notice: Subject to any disclaimer, the term of this patent is extended or adjusted under 35 U.S.C. 154(b) by 294 days.

(21) Appl. No.: 16/925,083

(22) Filed: Jul. 9, 2020

(65) Prior Publication Data

US 2020/0341285 A1     Oct. 29, 2020

Related U.S. Application Data

(63) Continuation of application No. PCT/CN2018/071951, filed on Jan. 9, 2018, and a continuation of application No. PCT/CN2018/071953, filed on Jan. 9, 2018.

(51) Int. Cl.
*G02B 27/01* (2006.01)
*H04N 13/344* (2018.01)
*H04N 13/332* (2018.01)
*G06T 19/00* (2011.01)

(52) U.S. Cl.
CPC ....... *G02B 27/0172* (2013.01); *H04N 13/332* (2018.05); *H04N 13/344* (2018.05); *G06T 19/006* (2013.01)

(58) Field of Classification Search
CPC ............ G02B 27/0172; H04N 13/332; H04N 13/344; G06T 19/006
See application file for complete search history.

(56) References Cited

U.S. PATENT DOCUMENTS

| | | | | |
|---|---|---|---|---|
| 3,936,605 A | * | 2/1976 | Upton | G02B 27/01 704/271 |
| 4,941,012 A | * | 7/1990 | Inabata | G03B 13/06 396/379 |
| 5,886,822 A | * | 3/1999 | Spitzer | G02B 27/145 359/633 |
| 6,204,974 B1 | * | 3/2001 | Spitzer | G02C 11/10 359/633 |

(Continued)

FOREIGN PATENT DOCUMENTS

| | | |
|---|---|---|
| CN | 103885184 A | 6/2014 |
| CN | 104007502 A | 8/2014 |

(Continued)

OTHER PUBLICATIONS

International Search Report and Written Opinion in PCT application No. PCT/CN2018/071951 dated Sep. 29, 2018.

(Continued)

*Primary Examiner* — Bao-Luan Q Le
(74) *Attorney, Agent, or Firm* — HAUPTMAN HAM, LLP

(57) ABSTRACT

Provided are an AR display method, an AR display apparatus and an AR display device, the device including: a display assembly used for displaying a virtual content, an optical assembly, and a micro mirror array coupled to the optical assembly; the micro mirror array is located on a propagation path of light emitted from the display assembly.

17 Claims, 14 Drawing Sheets

(56) References Cited

U.S. PATENT DOCUMENTS

| | | | |
|---|---|---|---|
| 6,353,503 B1* | 3/2002 | Spitzer | G02B 27/017 |
| | | | 359/630 |
| 9,366,869 B2* | 6/2016 | Martinez | G02B 27/0172 |
| 9,459,455 B2* | 10/2016 | Cakmakci | G02B 27/0172 |
| 9,835,866 B2* | 12/2017 | Widulle | G02B 5/10 |
| 9,946,074 B2* | 4/2018 | Cakmakci | G02B 27/0101 |
| 10,989,921 B2* | 4/2021 | Ha | G02B 27/017 |
| 11,086,130 B2* | 8/2021 | Kwon | G02B 27/0172 |
| 11,275,247 B2* | 3/2022 | Shin | G02B 27/4272 |
| 2002/0186179 A1* | 12/2002 | Knowles | G02B 27/0172 |
| | | | 345/87 |
| 2014/0022362 A1 | 1/2014 | Oellers | |
| 2015/0219899 A1 | 8/2015 | Mack et al. | |
| 2015/0378163 A1 | 12/2015 | Hiraide | |
| 2016/0313557 A1* | 10/2016 | Schmidt | G02B 27/0172 |
| 2017/0123207 A1* | 5/2017 | Kress | G02B 27/4205 |
| 2017/0168303 A1 | 6/2017 | Petrov | |
| 2017/0293144 A1* | 10/2017 | Cakmakci | G02B 27/017 |
| 2017/0299872 A1 | 10/2017 | Ou et al. | |
| 2017/0336634 A1 | 11/2017 | Mack et al. | |
| 2018/0136467 A1* | 5/2018 | Kim | G06F 3/011 |
| 2018/0292652 A1* | 10/2018 | Ha | G06T 19/00 |
| 2019/0204600 A1* | 7/2019 | Ha | G02B 27/0172 |
| 2019/0204601 A1* | 7/2019 | Ha | G02B 27/0172 |
| 2020/0183169 A1* | 6/2020 | Peng | G02B 6/0055 |

FOREIGN PATENT DOCUMENTS

| | | |
|---|---|---|
| CN | 104570352 A | 4/2015 |
| CN | 105898276 A | 8/2016 |
| CN | 105929545 A | 9/2016 |
| CN | 106371222 A | 2/2017 |
| CN | 108132538 A | 6/2018 |
| CN | 108227203 A | 6/2018 |
| CN | 207833115 U | 9/2018 |
| EP | 2508931 A1 | 10/2012 |

OTHER PUBLICATIONS

International Search Report and Written Opinion in PCT application No. PCT/CN2018/071953 dated Sep. 27, 2018.

* cited by examiner

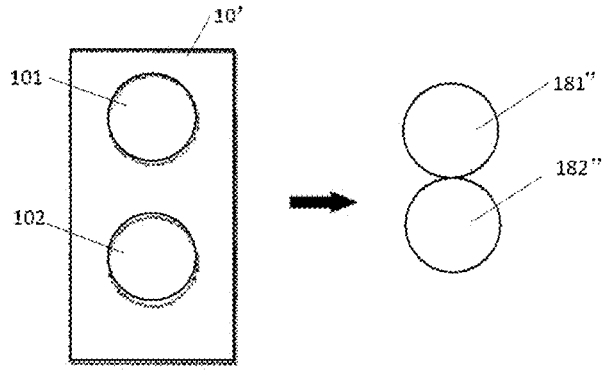

FIG. 2f determining a matrix spacing corresponding to a plurality of effective projection areas obtained after projecting via a projection assembly, according to a layout of a plurality of rectangular fields of view ~301 determining a matrix spacing of a plurality of effective display areas corresponding to the plurality of effective projection areas on a display screen, according to the matrix spacing corresponding to the plurality of effective projection areas and a scaling coefficient corresponding to the projection assembly ~302 determining a circular area corresponding to a field of view of each micro mirror unit in the micro mirror array on the display screen, according to an optical parameter of the micro mirror array ~303 determining a rectangular area in each of the circular area on the display screen, where a spacing between adjacent rectangular areas is equal to the matrix spacing of the effective display areas ~304 using the obtained plurality of rectangular areas as a plurality of effective display areas, and displaying a virtual content on the plurality of effective display areas to form a rectangular field of view at the human eye conforming to the layout ~305

FIG. 3a

AR DISPLAY METHOD, APPARATUS AND DEVICE PROVIDED MICRO MIRROR ARRAY

FIELD

The present disclosure relates to the field of augmented reality technology, and in particular, to an AR display method, an AR display apparatus and an AR display device.

BACKGROUND

Augmented reality (AR for short) is a display technology by displaying virtual objects or information overlapped with the real world environment.

Off-axis curved surface reflection elements, free-form surface prisms, geometric waveguides or holographic waveguides are usually used in an AR display device.

SUMMARY

Various aspects of the present disclosure provide an AR display method, an AR display apparatus and an AR display device.

In some embodiments, the present disclosure provides an AR display method, which is suitable for an AR display device, including: determining a matrix spacing corresponding to a plurality of effective projection areas obtained after being projected via a projection assembly, according to a layout of a plurality of rectangular fields of view; determining a matrix spacing of a plurality of effective display areas corresponding to the plurality of effective projection areas on a display screen, according to the matrix spacing corresponding to the plurality of effective projection areas and a scaling coefficient corresponding to the projection assembly; determining a plurality of rectangular areas corresponding to a field of view of a micro mirror array on the display screen, according to the matrix spacing of the plurality of effective display areas, as the plurality of effective projection areas; and displaying a virtual content in the plurality of effective display areas.

In some embodiments, the present disclosure further provides an AR display apparatus, including: a memory and a processor; the memory is used to store one or more computer instructions; the processor is used to execute the one or more computer instructions for: determining a matrix spacing of a plurality of effective projection areas after being projected by via a projection assembly, according to a layout of a plurality of rectangular fields of view; determining a matrix spacing of a plurality of effective display areas corresponding to the plurality of effective projection areas on a display screen, according to the matrix spacing corresponding to the plurality of effective projection areas and a scaling coefficient corresponding to the projection assembly; determining a plurality of rectangular areas corresponding to a field of view of a micro mirror array on the display screen, according to the matrix spacing of a plurality of effective display areas, as the plurality of effective projection areas; and displaying a virtual content in the plurality of effective display areas.

In some embodiments, the present disclosure further provides an AR display device, including: a display assembly used for displaying a virtual content, an optical assembly, and a micro mirror array coupled to the optical assembly; the micro mirror array is located on a propagation path of light emitted from the display assembly; and the light emitted from the display assembly is reflected by the micro mirror array, then is projected on to the retina of a wearer.

According to some embodiments, by providing the micro mirror array coupled to the optical assembly, the wearer may get a virtual content overlapped with the ambient environment. In the above structure, a micro mirror in the micro mirror array may serve as an aperture stop, which has a relative small size. By the function of the aperture stop, the depth of field of the virtual content can be increased consequently. Besides, the plurality of effective display areas are provided on the display screen, and the plurality of effective display areas are all rectangular areas and their matrix parameter and matrix spacing correspond to the matrix parameter and matrix spacing of the micro mirror array. Based on the above structure, when displaying a virtual content, it is displayed in the effective display area of the display screen, and other areas are not displayed, so that when the eye of the wearer views a real scene of different spatial depths, it is possible to view a virtual content displayed in a rectangular field of view.

BRIEF DESCRIPTION OF THE DRAWINGS

The drawings described herein are used to provide a further understanding of the present application and constitute a part of the present application. The example embodiments of the present application and the descriptions thereof are used to explain the present application, and do not constitute an improper limitation on the present application. In the drawings.

Figure 1A:
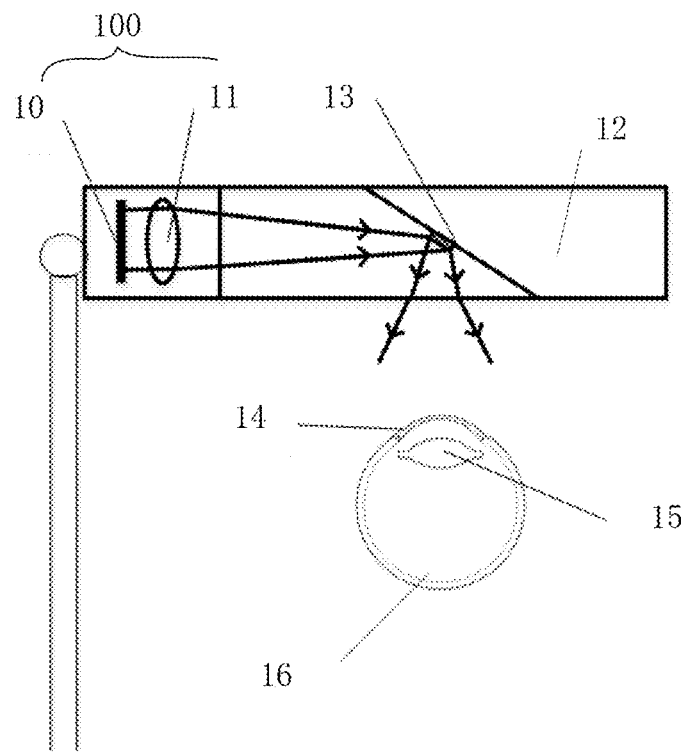
FIG. 1a is a schematic diagram of a structure of an AR display device according to some embodiments of the present disclosure.
Figure 1B:
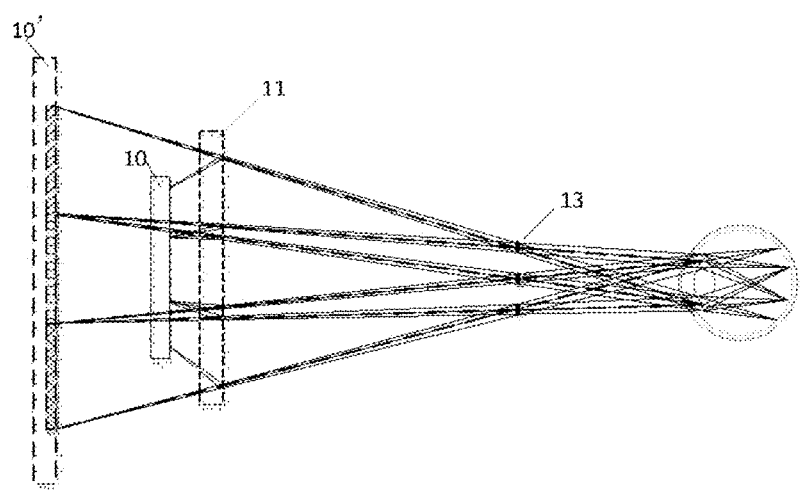
FIG. 1b is a schematic diagram of an optical path corresponding to an AR display device according to some embodiments of the present disclosure.
Figure 1C:
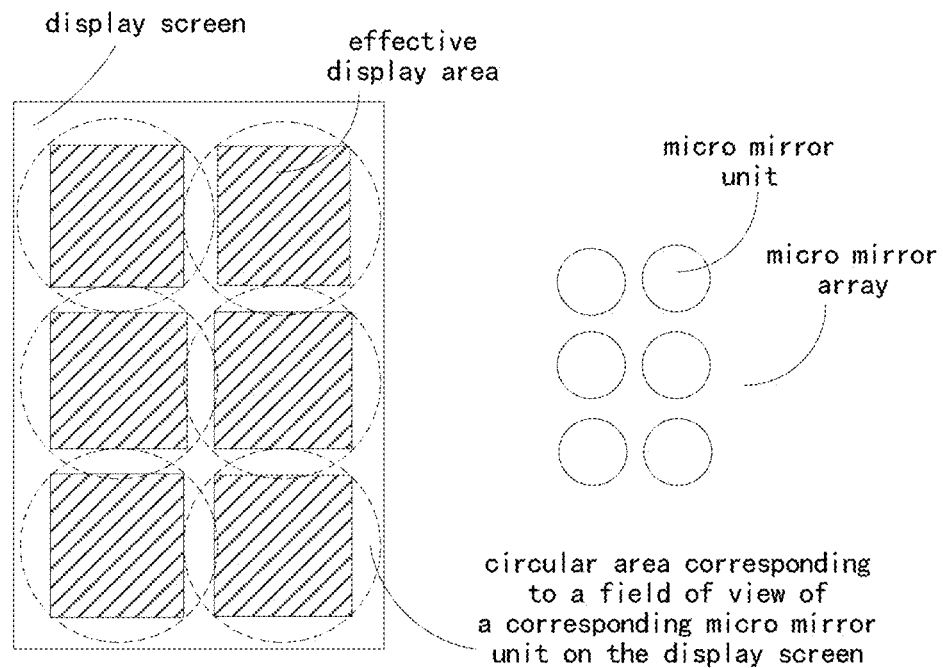
FIG. 1c is a schematic diagram of a correspondence between an effective display area and a micro mirror array according to some embodiments of the present disclosure.
Figure 1D:
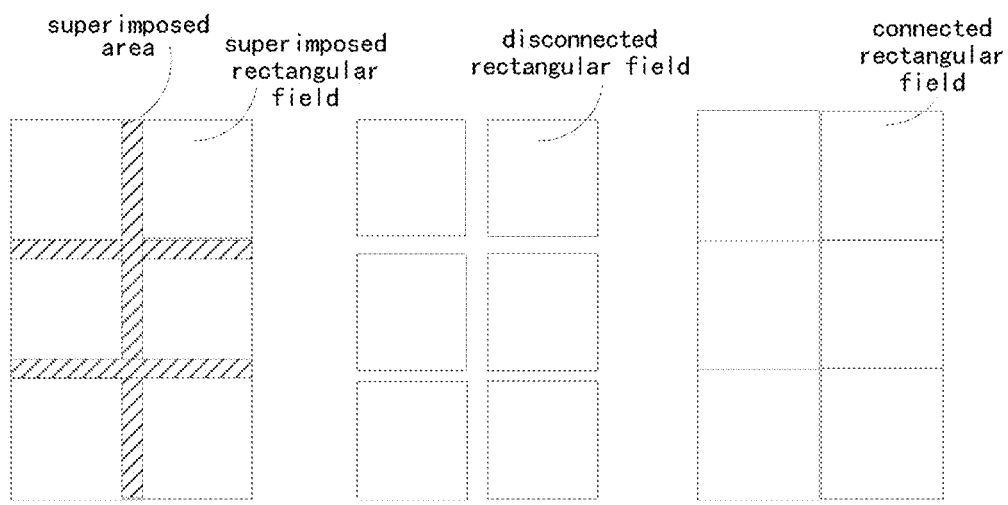
FIG. 1d is a schematic diagram of a rectangular field of view with different layouts according to some embodiments of the present disclosure.
Figure 1E:
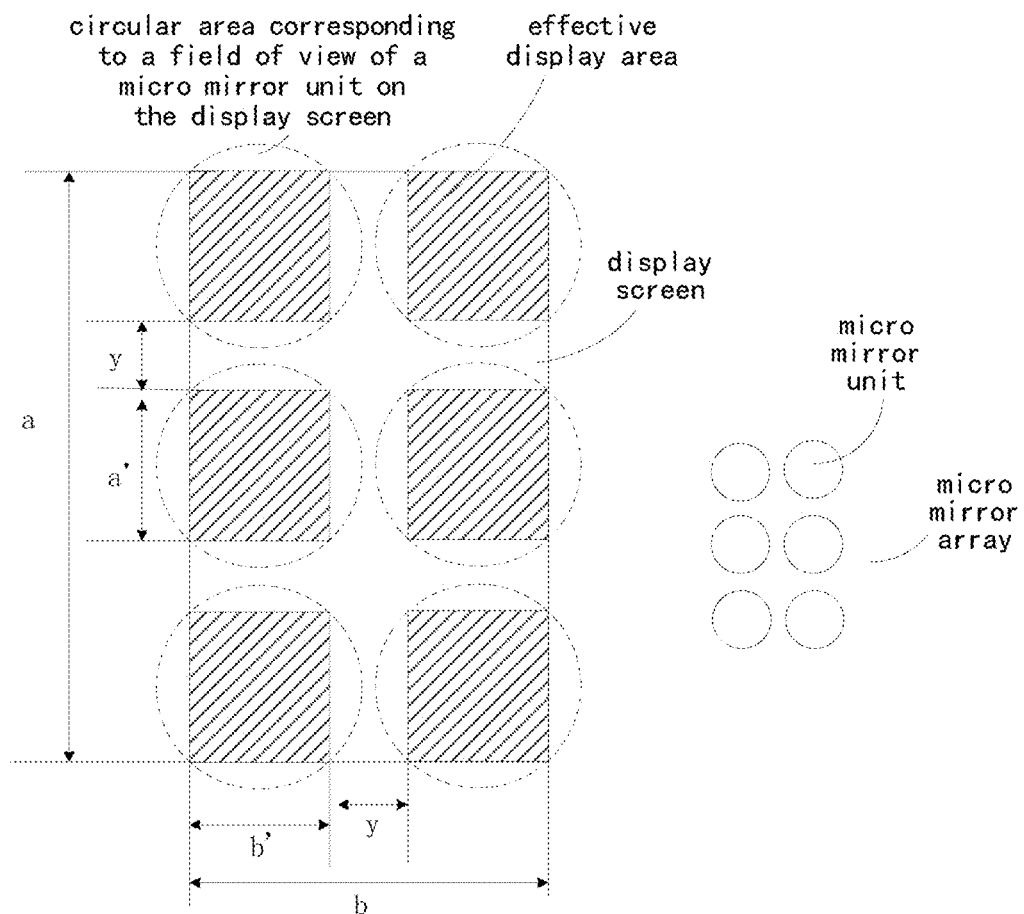
FIG. 1e is a schematic diagram of a correspondence between an effective display area and a micro mirror array according to some embodiments of the present disclosure.
Figure 1F:
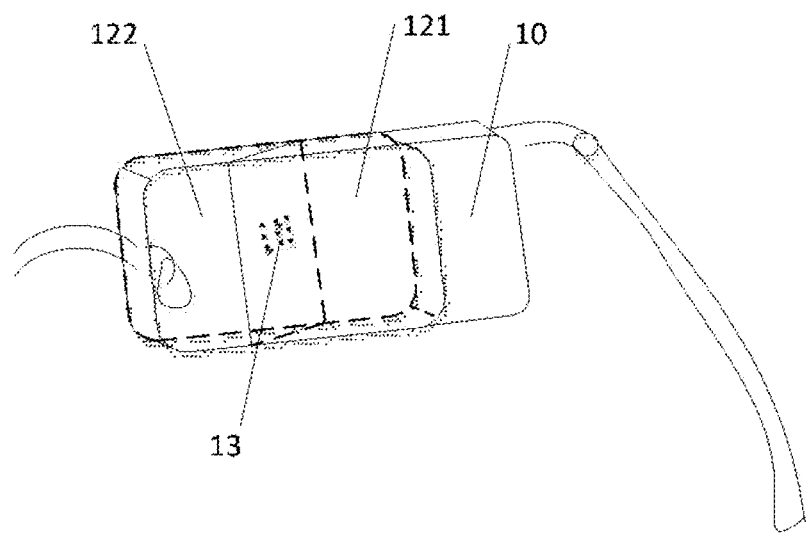
Figure 1G:
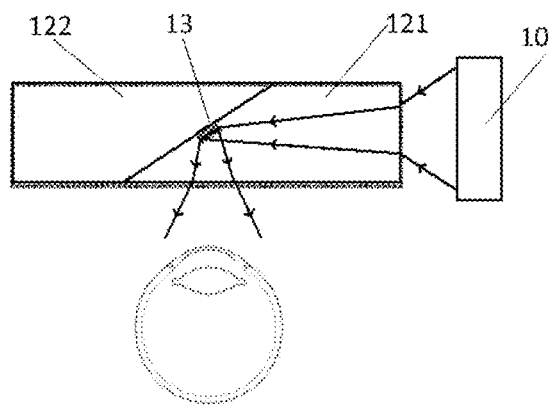
Figure 1H:
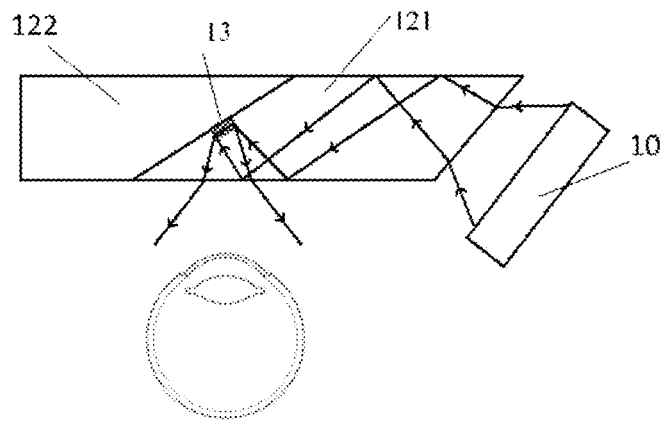
Figure 1I:
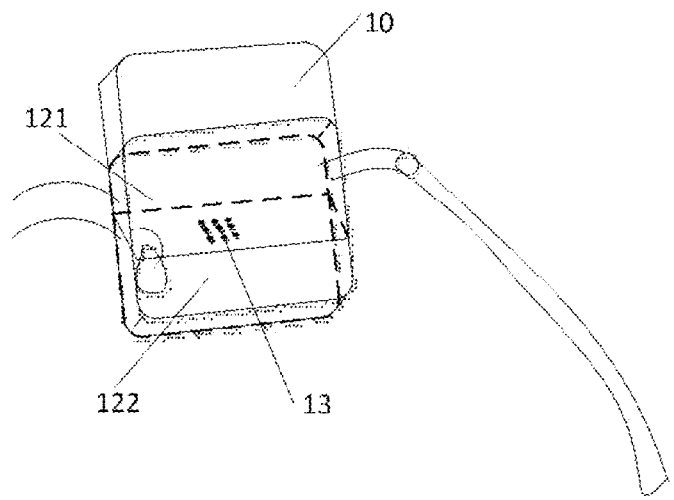
Figure 2A:
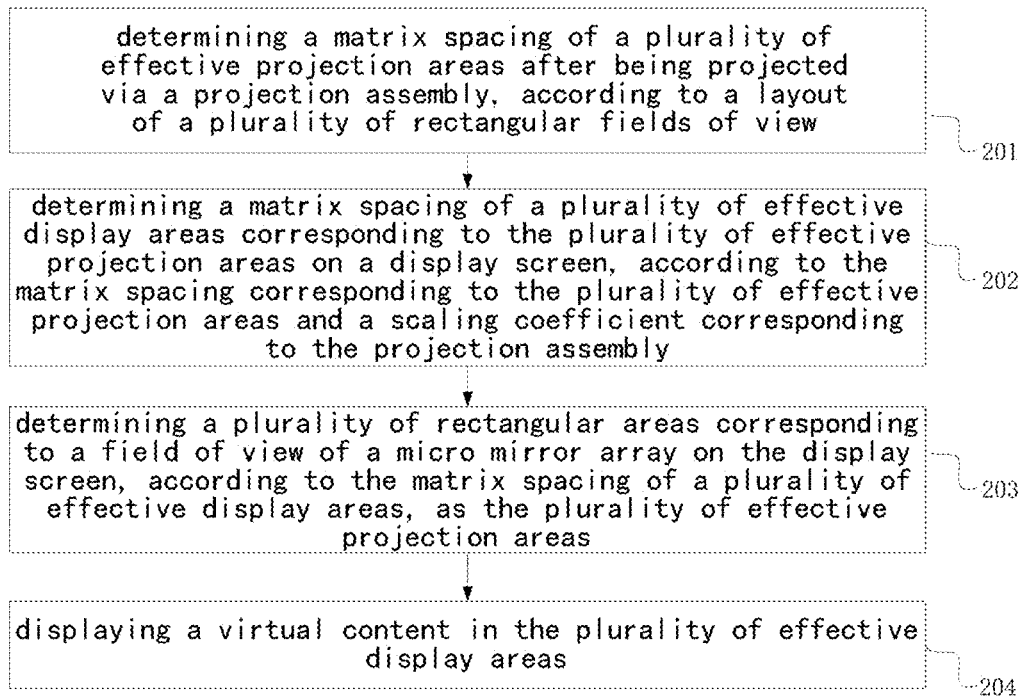
Figure 2B:
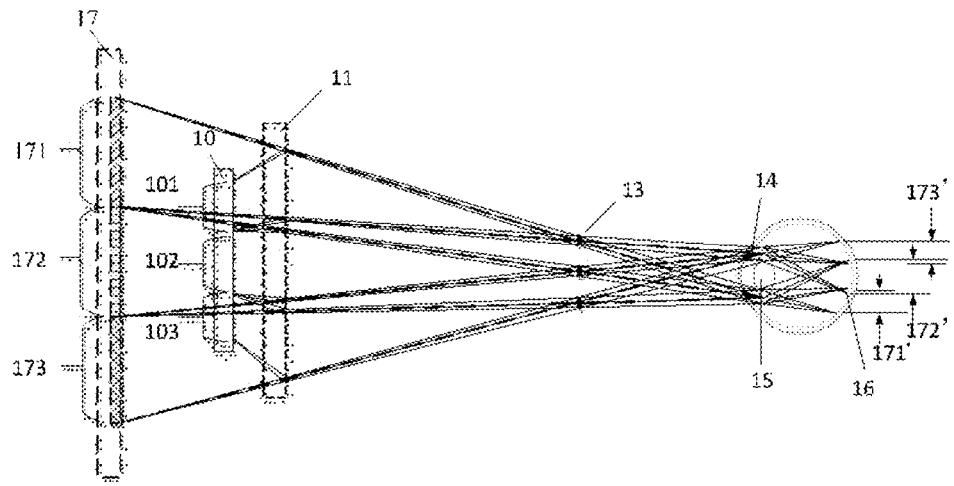
Figure 2C:
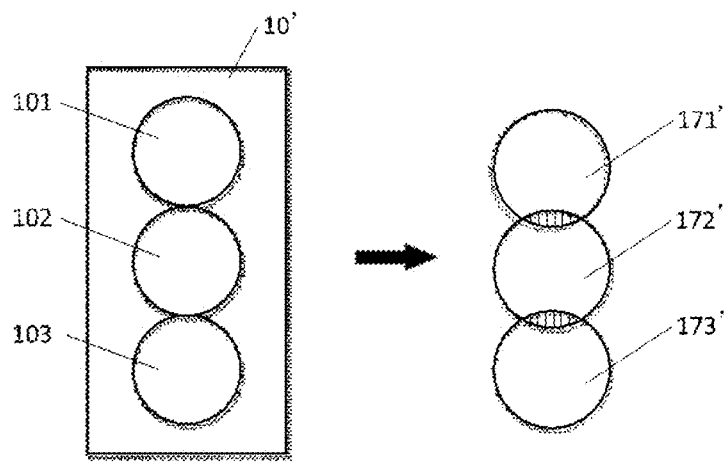
Figure 2D:
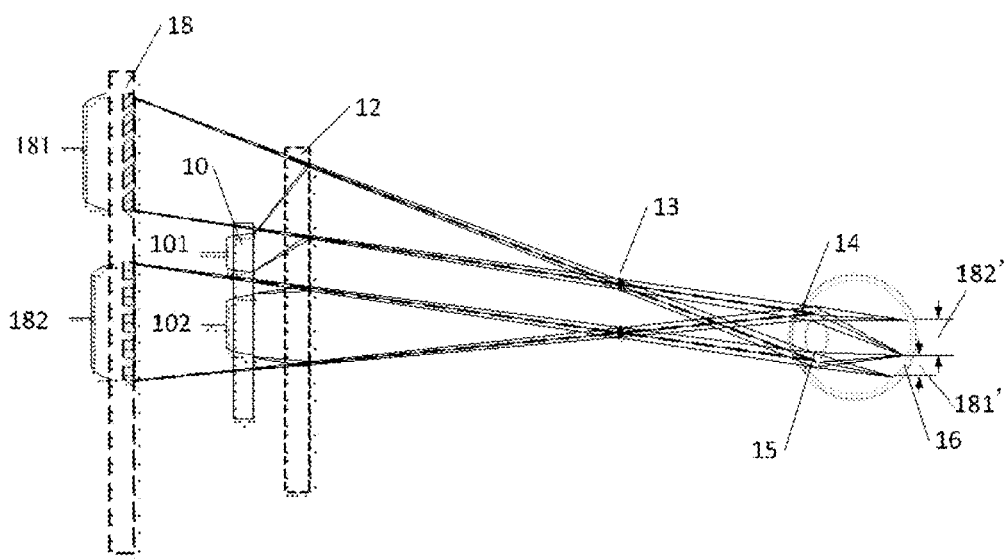
Figure 2E:
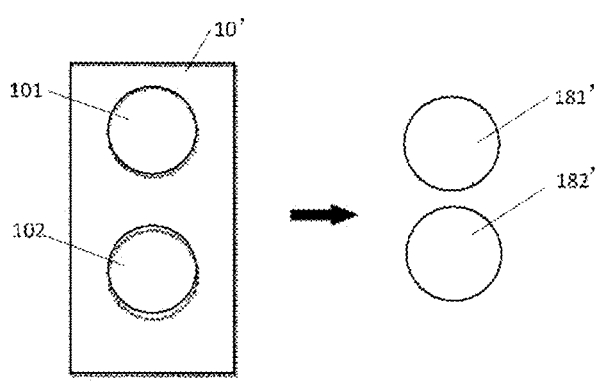
Figure 3B:
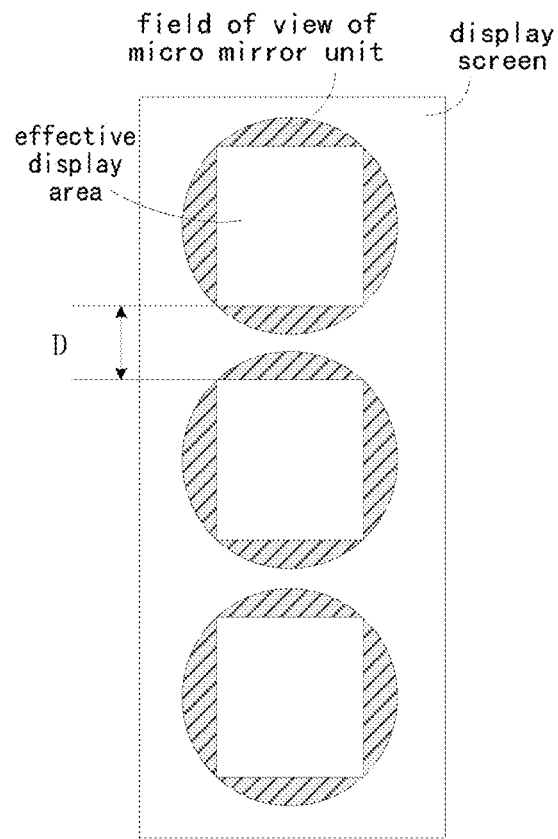
Figure 3C:
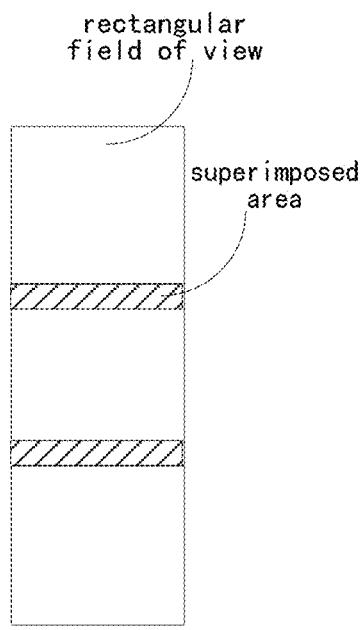
Figure 3D:
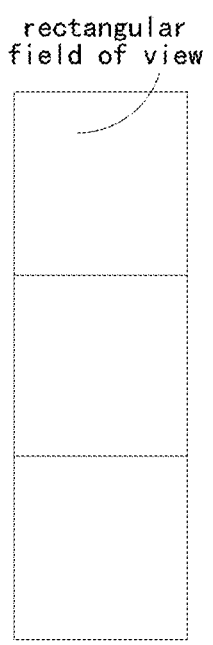
Figure 4A:
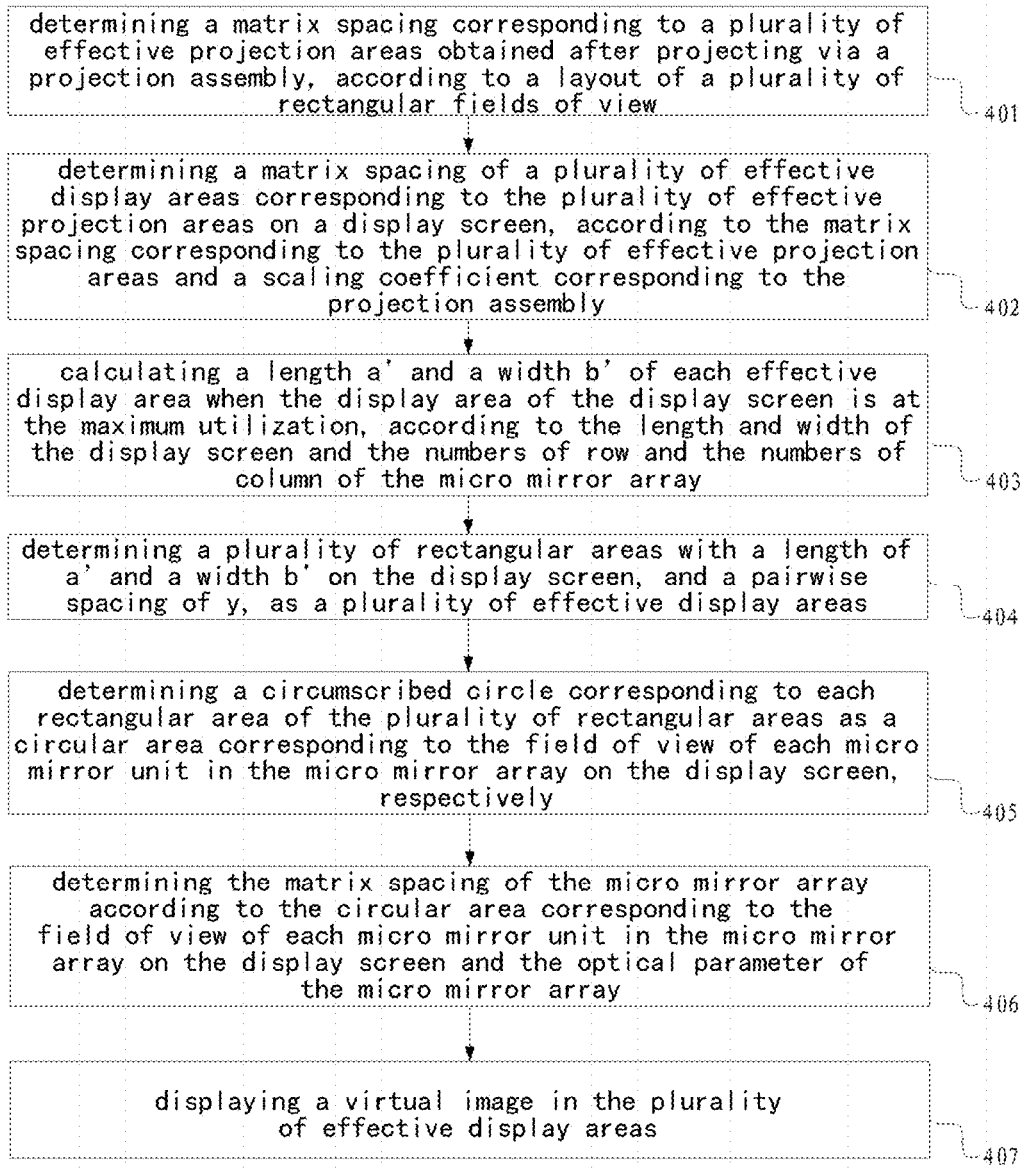
Figure 4B:
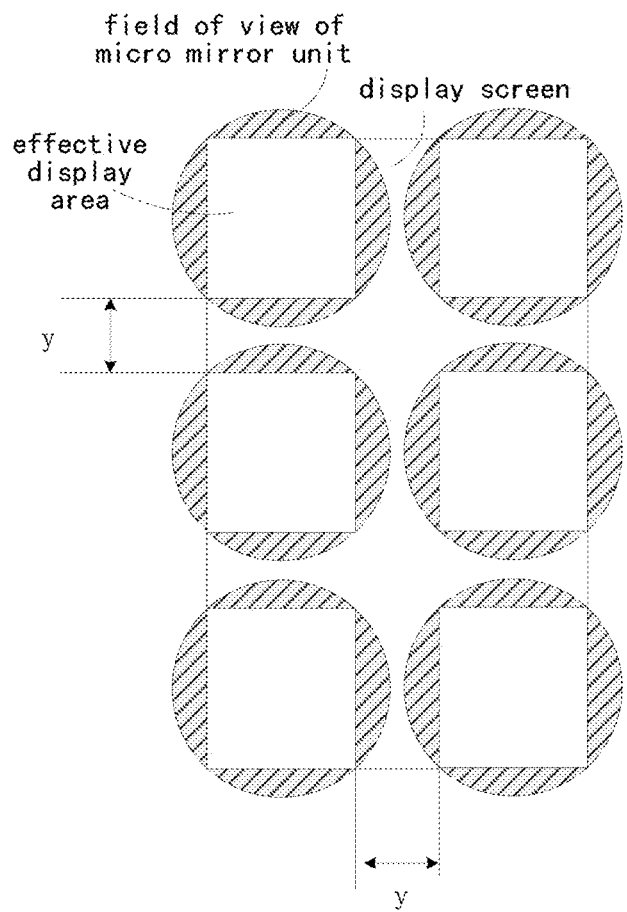
Figure 4C:
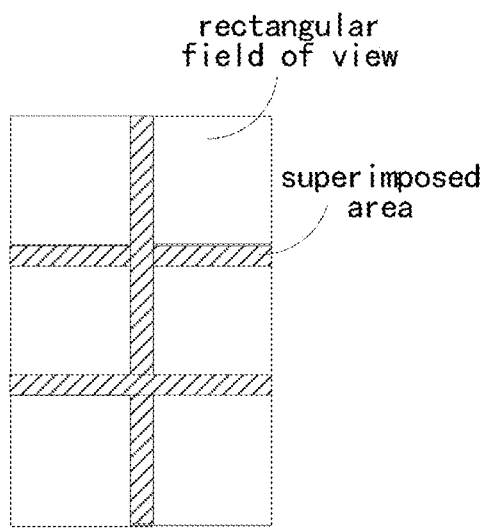
Figure 4D:
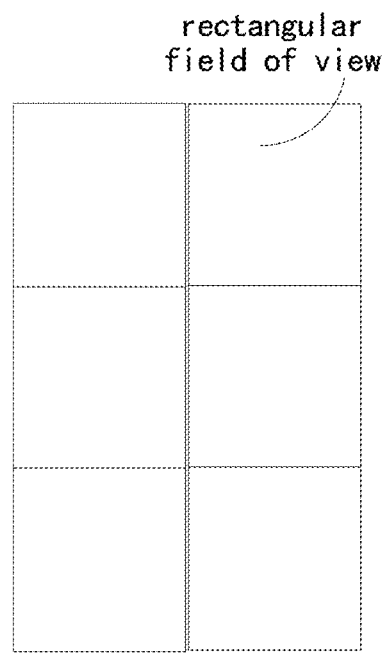
Figure 5:
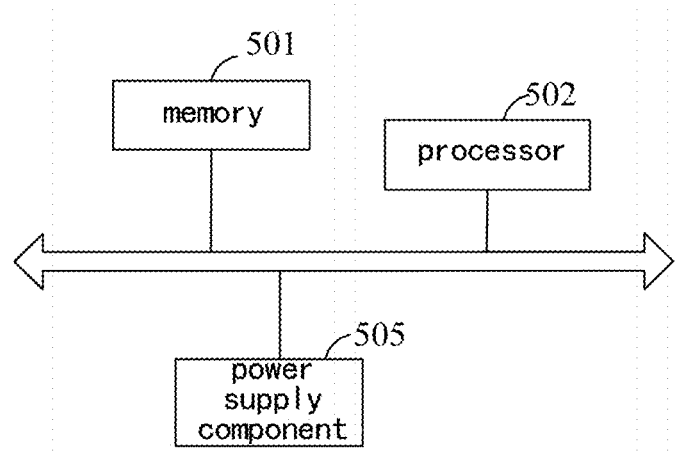
Figure 6:
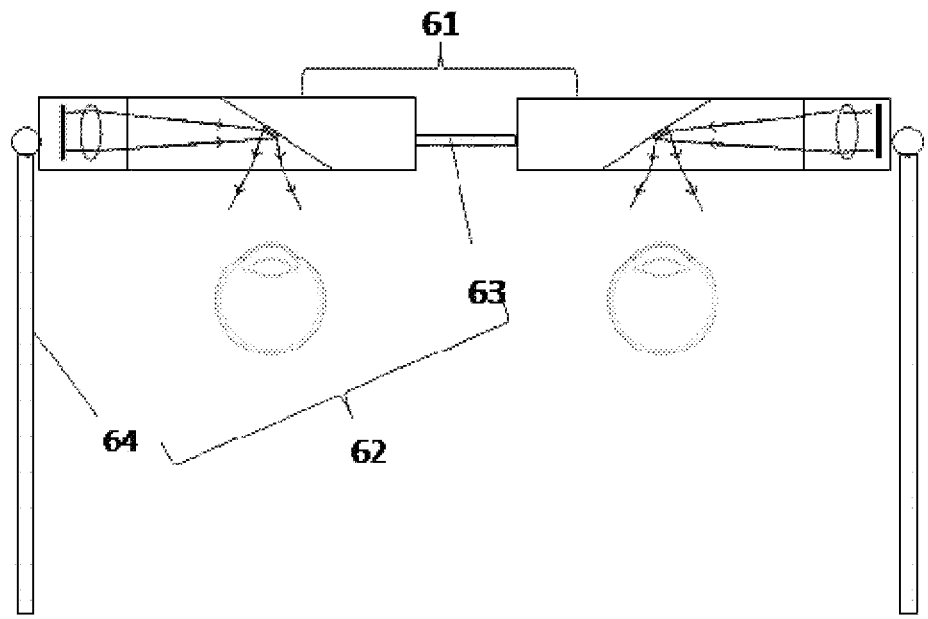
Figure 7:
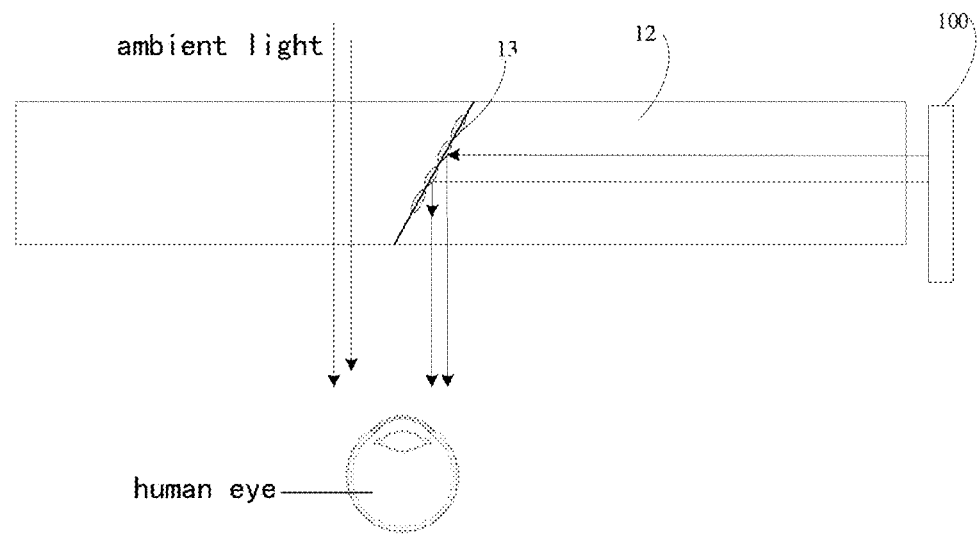
Figure 8:
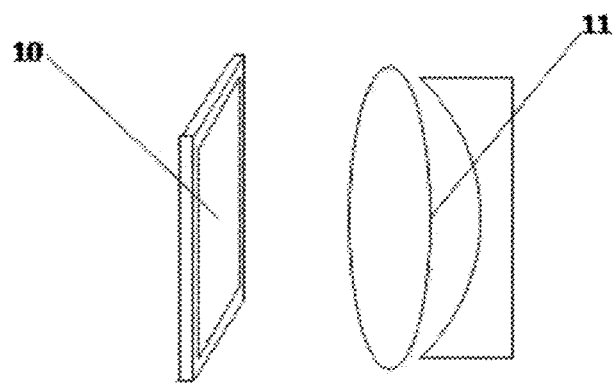

FIG. if is a schematic diagram of a structure of an AR display device according to some embodiments of the present disclosure;

FIG. 1g is a top view of a structure of an AR display device according to some embodiments of the present disclosure;

FIG. 1h is a top view of a structure of an AR display device according to some embodiments of the present disclosure;

FIG. 1i is a schematic diagram of a structure of an AR display device according to some embodiments of the present disclosure;

FIG. 2a is a flowchart of an AR display method according to some embodiments of the present disclosure;

FIG. 2b is an optical path diagram corresponding to an AR display device according to the present disclosure;

FIG. 2c is a superimposed circular field of view corresponding to FIG. 2b;

FIG. 2d is an optical path diagram corresponding to an AR display device according to the present disclosure;

FIG. 2e is a disconnected circular field of view corresponding to FIG. 2c;

FIG. 2*f* is a connected circular field of view corresponding to FIG. 2*c*;

FIG. 3*a* is a flowchart of an AR display method according to some embodiments of the present disclosure;

FIG. 3*b* is a schematic diagram of an effective display area corresponding to FIG. 3*a*;

FIG. 3*c* is a schematic diagram of a superimposed field of view of an effective display area according to FIG. 3*b*;

FIG. 3*d* is a schematic diagram of a disconnected field of view of an effective display area according to FIG. 3*b*;

FIG. 4*a* is a flowchart of an AR display method according to some embodiments of the present disclosure;

FIG. 4*b* is a schematic diagram of an effective display area corresponding to FIG. 4*a*;

FIG. 4*c* is a schematic diagram of a superimposed field of view of an effective display area according to FIG. 4*b*;

FIG. 4*d* is a schematic diagram of a disconnected field of view of an effective display area according to FIG. 4*b*;

FIG. 5 is a schematic diagram of a structure of an AR display apparatus according to some embodiments of the present disclosure;

FIG. 6 is a schematic diagram of a structure of an AR display device according to some embodiments of the present disclosure; and FIG. 7 is a schematic diagram of a structure of an AR display device according to some embodiments of the present disclosure; and FIG. 8 is a schematic diagram of a structure of a display assembly according some embodiments of the present disclosure.

DETAILED DESCRIPTION OF EXAMPLE EMBODIMENTS

The technical solutions in some embodiments of the present disclosure will be described below in combination with the drawings in some embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

FIG. 1*a* is a schematic diagram of a structure of an AR display device according to some embodiments of the present disclosure. As shown in FIG. 1*a*, the AR display device includes a display assembly 100 used for displaying a virtual content, an optical assembly 12, and a micro mirror array 13 coupled to the optical assembly 12. In some embodiments, the virtual content may include a virtual image, video or other information; the optical assembly 12 may include a prism, or a mirror, or a combination of a prism and a mirror; and the micro mirror array 13 is in contact with the optical assembly 12, may be located on a surface of the optical assembly 12, or may be located inner the optical assembly 12.

As shown in FIG. 8, the display assembly 100 includes a display screen 10 and a projection assembly 11. The projection assembly 11 is provided between the display screen 10 and the micro mirror array 13. The micro mirror array 13 includes a plurality of micro mirror units arranged in a matrix according to a matrix parameter and a matrix spacing, and the micro mirror array 13 is provided on a propagation path of light emitted from the display assembly 100. In some embodiments, the matrix parameter and the matrix spacing are preset. In some embodiments, the plurality of micro mirror units may be a plurality of micro reflection mirrors or a plurality of reflection films. In some embodiments, the micro reflection films are films with relative small size which is able to reflect light.

The matrix parameter of the micro mirror array 13 refers to the numbers of rows and the numbers of columns of the matrix formed by the plurality of micro mirror units. For example, the matrix parameter of the micro mirror array 13 is 2×2, which means that the micro mirror array 13 is formed by four micro mirror units in two rows and two columns. The matrix spacing of the micro mirror array 13 refers to the spacing between two adjacent micro mirror units in the same row or the spacing between two adjacent micro mirror units in the same column.

The display screen 10 includes a plurality of effective display areas, formed into a matrix, all of which may be rectangular areas, and a matrix parameter and a matrix spacing of the plurality of effective display areas respectively correspond to the matrix parameter and the matrix spacing of the micro mirror array 13. In some embodiments, a rectangular area has two adjacent sides, and the length of the adjacent sides may be equal to each other or be different from each other.

In the above-mentioned AR display device, the light emitted from the display assembly 100 is reflected by the micro mirror array 13, and then passes through the pupil 14 and the crystalline lens 15 of wearer in successively and would be projected on the retina 16, the eye of the wearer may get the virtual content displayed by the display assembly 100 overlapped on the real scene. In some embodiments, the ambient light of the real scene is transmitted forward the human eye through the cemented interface except the area occupied by the micro mirror array, since the micro mirror array blocks the ambient light to be transmitted forward the human eye.

In some embodiments, by providing the micro mirror array coupled with the optical assembly, the wearer may get a virtual content overlapped with the ambient environment. In the above structure, the micro mirror units in the micro mirror array may serve as an aperture stop, which has a relative small size. By the function of the aperture stop, the depth of field of the virtual content can be increased consequently. Besides, the plurality of effective display areas are provided on the display screen, and the plurality of effective display areas are all rectangular areas and their matrix parameter and matrix spacing correspond to the matrix parameter and matrix spacing of the micro mirror array. Based on the above structure, when displaying a virtual content, it is displayed in the effective display area of the display screen, and other areas are not displayed, so that when the eye of the wearer views a real scene of different spatial depths, it is possible to view a virtual content displayed in a rectangular field of view. It should be noted when displaying the virtual content, the virtual content is displayed in separated sections, and each section of the virtual content is projected on to the retina of the wearer, and an integral content corresponding to the integral virtual content then would be finally sensed by the wearer.

In some embodiments, the display screen 10 is located within one focal length of the projection assembly 11. FIG. 1*b* is an optical path diagram corresponding to an AR display device according to some embodiments of the present disclosure. As shown in FIG. 1*b*, the display screen 10 displays a virtual content, the projection assembly 11 receives the light corresponding to the virtual content from the display screen 10, transmits the light forward the optical assembly 12, here an enlarged virtual content 10' of the displayed content would be got. The micro mirror array 13 receives the light from the projection assembly 11, and then reflects the received light from the projection assembly 11 forward the human eye. In some embodiments, the display screen 10 may be an LCOS (short of Liquid Crystal on Silicon) display system, a Micro-OLED (short of Micro-Organic Light-Emitting Diode) display system or other micro display elements, or a display module such as the laser scanning system, which is not limited in the present disclosure. In some embodiments, all effective display areas on the display screen works collaboratively for displaying an integral virtual content, by one possible way lying that each effective display area displays one individual section of the integral virtual content. After the acting of the micro mirror units in the micro mirror array, an integral content corresponding to the integral virtual content would be sensed by the wearer.

The projection assembly 11 may include one or more lenses. As illustrated in FIG. 1a and FIG. 1b, the projection assembly 11 includes one lens. It should be understood that the projection assembly 11 provided by some embodiments of the present disclosure is not limited to the illustrated content. In some embodiments, each surface of the projection assembly 11 may be a flat surface, a spherical surface, an aspherical surface, a Fresnel surface, and a free-form surface, and the lens material may be glass or resin, which is not limited in the present disclosure.

According to some embodiments, as shown in FIG. 1c, the matrix parameter of the plurality of effective display areas on the display screen 10 may be the same as the matrix parameter of the micro mirror array 13, and each effective display area is located within a circular area corresponding to a field of view of a corresponding micro mirror unit on the display screen, respectively.

In some embodiments, the projection assembly 11 may satisfy (for example, a scaling coefficient of the projection assembly 11): making a spacing obtained by projecting the matrix spacing of the plurality of effective display areas via the projection assembly be less than the matrix spacing of the micro mirror array 13. In this case, a superimposed rectangular field of view as shown in FIG. 1d may be projected on to the retina 16.

In some embodiments, the scaling coefficient of the projection assembly 11 may satisfy: making a spacing obtained by projecting the matrix spacing of the plurality of effective display areas via the projection assembly be equal to the matrix spacing of the micro mirror array 13. In this case, a disconnected rectangular field of view as shown in FIG. 1d may be projected on to the retina 16. When a spacing obtained by projecting the matrix spacing of the plurality of effective display areas via the projection assembly 11 is equal to the matrix spacing of the micro mirror array 13, a connected (not overlapped and continuous in physical space) rectangular field of view as shown in FIG. 1d may be projected on to the retina 16. In some embodiments, the matrix spacing of the micro mirror array may be set as 4 mm, which is the average value of the pupil diameter of the human eye.

In the above embodiments, each effective display area is located within a circular area on the display screen 10, which a field of view of a corresponding micro mirror unit is corresponded to, as shown in FIG. 1c.

In some embodiments, as shown in FIG. 1e, in the plurality of effective display areas on the display screen 10, the length of each effective display area is $a'=[a-y(M-1)]/M$, and the width is $b'=[b-y(N-1)]/N$.

Where a and b are the length and width of the display screen 10, respectively, y is the matrix spacing of a plurality of effective display areas, $a' \in (0, a]$, $b' \in (0, b]$, $y \prec \max(a, b)$, max( ) means to take the maximum value; M is the numbers of row of the micro mirror array 13 and N is the numbers of column of the micro mirror array 13; where, the scaling coefficient of the projection assembly 11 satisfies: making a spacing obtained by projecting the matrix spacing of the plurality of effective display areas via the projection assembly 11 be equal to 4 mm. In the present disclosure, the matrix spacing of the micro mirror array 13 satisfies: making each effective display area on the display screen 10 be located within a circular area on the display screen 10, where the circular area corresponds to a field of view of a corresponding micro mirror unit.

FIG. 1f is a schematic diagram of a structure of an AR display device according to some embodiments of the present disclosure. As shown in FIG. 1f, in some embodiments, the optical assembly 12 includes a first lens 121 and a second lens 122 that are cemented together. The micro mirror array 13 may be provided on the cemented interface between the first lens 121 and the second lens 122, and the reflection surface of the micro mirror array 13 is close to the human eye. In some embodiments, the ambient light of the real scene is transmitted forward the human eye by the first lens 121 and the second lens 122.

The materials of the first lens 121 and the second lens 122 may be glass or resin. The cemented interface between the first lens 121 and the second lens 122 may be a flat surface, a spherical surface, an aspherical surface, or a free-form surface, etc., which is shown as a flat surface in FIG. 1f and other drawings, but it should be understood that, the cemented interface may also be other surfaces.

As shown in FIG. 1f, in some embodiments, the cemented interface may be an inclined surface. On the inclined surface, the micro mirror units arranged along the direction from a side close to the human eye toward a side away from the human eye form a row in the matrix of the micro mirror array 13; and the micro mirror units arranged along the direction from top towards bottom form a column in the matrix of the micro mirror array 13.

The plurality of micro mirror units forming the micro mirror array 13 may be optical elements different from the optical assembly 12. In some embodiments, the plurality of micro mirror units is the plurality of micro reflection mirrors or the plurality of reflection films, which may be attached to the cemented interface of the optical assembly 12 in accordance with a matrix parameter and a matrix spacing. In other embodiments, the plurality of micro mirror units may be optical structures integrated with the optical assembly 12, for example, a plurality of microstructures having a reflection function etched on the optical assembly 12. The plurality of microstructures may be etched on the cemented interface of the optical assembly 12 in accordance with a matrix parameter and a matrix spacing and is coated with a reflection film.

In some embodiments, the matrix spacing of the micro mirror array 13 may take the cemented interface as a reference surface. In this case, the matrix spacing may be equal to the spacing of two adjacent micro mirror units on the cemented interface. In other embodiments, the matrix spacing of the micro mirror array 13 may take the front surface close to the human eye or the rear surface away from the human eye on the optical assembly 12 as a reference surface. In this case, the matrix spacing refers to the spacing of two projections on the reference surface, which the two adjacent micro lens units are corresponded to.

In some embodiments, the aperture of each micro mirror unit in the micro mirror array 13 may be 100 μm-2 mm, for example, when the micro mirror array 13 is formed by micro reflection mirrors, the aperture of the micro reflection mirrors may be 100 µm-2 mm. The micro mirror unit in small size blocks the light of the real scene in a relative small amount, which makes the AR display device have a better perspective effect of the real scene; besides, the micro mirror unit in small size has stray light in relative low level, which makes the virtual content viewed by the human eye have a contrast in relative high level. In addition, the micro mirror unit in small size may match the resolution of the human eye and have a small color difference.

In some embodiments, the surface of the micro reflection mirror or the microstructure coated with the reflection film may be a flat surface, a spherical surface, an aspherical surface, a Fresnel surface and a free-form surface, and the material of the micro reflection mirror or the reflection film may be silver, aluminum or other materials with high reflectivity, which is not limited in the present disclosure.

In some embodiments, the interface for cementing the first lens 121 and the second lens 122 may be an inclined interface, and the micro mirror array 13 is provided on the side of the inclined surface close to the human eye to reflect the light incident thereon toward the human eye. In some embodiments, when the cemented interface is an inclined interface, the cemented interface may be inclined toward the end of the first lens 121, that is, the angle between the cemented interface and the front surface of the first lens 121 close to the human eye is an acute angle. In some embodiments, the angle of inclination of the cemented interface may be at an angle of 45° with the direction of line of sight, this angle is convenient for the wearer to view the content reflected by the micro mirror array 13. The end refers to the other end of the first lens 121 or the second lens 122 except for the end where the cemented interface is located.

The display assembly 100 is provided outside the end surface of the first lens 121. The light emitted from the display assembly 100 reach the micro mirror array 13 via the end surface of the first lens 121 would be reflected by the micro mirror array 13, and is finally viewed by the human eye. In some embodiments, in the case where the cemented interface inclines towards the end of the first lens 121, as shown in FIG. 1f and FIG. 1g, the lateral length of the front surface of the first lens 121 close to the human eye is greater than the lateral length of the rear surface away from the human eye. At this time, the light reflected by the micro mirror array 13 is projected on to the human eye through the front surface of the first lens 121.

It should be understood that FIG. 1f shows the situation that the first lens 121 being on the right and the second lens 122 being on the left. In other embodiments, the first lens 121 may be on the left and the second lens 122 may be on the right.

In some embodiments, as shown in FIG. 1g, the end surface of the first lens 121 is perpendicular to the rear surface and the front surface of the first lens 121, and the light emitting surface of the display assembly 100 is parallel to the end surface of the first lens 121. The end surface is a surface located at the end. In the structure shown in FIG. 1g, the light emitted from the display assembly 100 directly reaches the micro mirror array 13 via the end surface of the first lens 121, is then reflected by the micro mirror array 13, and is finally viewed by the human eye.

In some embodiments, as shown in FIG. 1h, the end surface of the first lens 121 is inclined to the rear surface of the first lens 121 at an acute angle, and the light emitting surface of the display assembly 100 is parallel to the end surface of the first lens 121. In the structure shown in FIG. 1h, after passing through the end surface of the first lens 121, the light emitted from the display assembly 100 enters the first lens 121 on its rear surface at the critical angle of total reflection, propagates inside the first lens 121, and then arrives the micro mirror array 13, and would be reflected by the micro mirror array 13 to the human eye. It should be understood that FIG. 1h shows the situation that the end surface of the first lens 121 being inclined at an acute angle to the rear surface of the first lens 121. In other embodiments, the end surface of the first lens 121 may be inclined at an acute angle to the front surface of the first lens 121.

In some embodiments, the lateral length of the front surface of the first lens 121 and the lateral length of the rear surface of the second lens 122 may be the same, and the lateral length of the rear surface of the first lens 121 and the lateral length of the front surface of the second lens 122 may be the same.

Above drawings, the situation that the first lens 121 and the second lens 122 being cemented along a line connecting the left eye and the right eye is shown. In some embodiments, as shown in FIG. 1i, the first lens 121 and the second lens 122 may be cemented along a direction perpendicular to the line connecting the left eye and the right eye.

The AR display device provided by some embodiments of the present disclosure may be applied to AR glasses, or AR head-mounted devices, and may also be applied to a head-up display used in the vehicle. The present disclosure includes but is not limited to this. It should be understood that all AR products that adopt the technical solutions provided by some embodiments of the present disclosure are within the scope of the present disclosure.

FIG. 2a is a method flowchart of an AR display method according to some embodiments of the present disclosure. With reference to FIG. 2a, the method includes:
  step 201: determining a matrix spacing of a plurality of effective projection areas after being projected via a projection assembly, according to a layout of a plurality of rectangular fields of view;
  step 202: determining a matrix spacing of a plurality of effective display areas corresponding to the plurality of effective projection areas on a display screen, according to the matrix spacing corresponding to the plurality of effective projection areas and a scaling coefficient corresponding to the projection assembly;
  step 203: determining a plurality of rectangular areas corresponding to a field of view of a micro mirror array on the display screen, according to the matrix spacing of a plurality of effective display areas, as the plurality of effective projection areas; and
  step 204: displaying a virtual content in the plurality of effective display areas.

In step 201, the layout of the plurality of rectangular fields of view refers to a laying out characteristic that the plurality of rectangular fields of view is possessed, when the wearer views the virtual content through the AR display device.

The effective projection area refers to areas corresponding to the effective display area on the display screen after being projected via the projection assembly. There is a correspondence between the matrix spacing corresponding to the effective projection area and the layout of the rectangular field of view. After determining the layout of the rectangular field of view, the matrix spacing corresponding to the effective projection area may be determined.

In step 202, for the projection assembly, the effective display area on the display screen and the effective projection area are the object side and the image side, respectively. Therefore, after determining the matrix spacing corresponding to the effective projection area, the matrix spacing corresponding to the effective projection area may be regarded as the image side of the projection assembly, the object side corresponding to the image is calculated according to the projection imaging principle and the optical parameter of the projection assembly, and the object side is the matrix spacing of the effective display areas on the display screen.

In step 203, the field of view of the micro mirror array refers to a range that the human eye can view through the micro mirror array, and this range may correspond to a circular area on the display screen. Each micro lens unit in the micro mirror array corresponds to one field of view, and a plurality of fields of view are stitched together to form the field of view of the micro mirror array. Since the micro lens unit in the micro mirror array is arranged in a preset array arrangement according to some embodiments, the circular area corresponding to the field of view of the micro mirror array on the display screen may also be arranged according to this array arrangement.

After determining the matrix spacing of the effective display areas, the rectangular area corresponding to the field of view of the micro mirror array may be determined in combination with the array arrangement of the circular area corresponding to the field of view of the micro mirror array on the display screen, and the determined rectangular area is used as the effective display area on the display screen.

In step 204, after determining the effective display area, the virtual content may be displayed within the effective display area, and the virtual content is not displayed outside the effective display area. Thereby, the wearer can view the rectangular field of view conforming to the layout through the AR display device. In some embodiments, the virtual content may include an image, video or other information.

In the present disclosure, according to the layout of the rectangular field of view, after determining the matrix spacing corresponding to the plurality of effective projection areas obtained by projecting via the projection assembly, the rectangular area for displaying virtual content is determined on the display screen based on the matrix spacing and the scaling coefficient corresponding to the projection assembly, and the virtual content is displayed in this rectangular area. Thereby, through an AR display device based on a micro mirror array, a virtual content viewed by the wearer may lay out in a rectangle shaped field of view.

In the foregoing embodiments, it is described that the matrix spacing corresponding to the plurality of effective projection areas obtained after projecting via the projection assembly may be determined according to the layout of the rectangular field of view. In other embodiments, the layout of the rectangular fields of view may include: disconnected rectangular field of view or superimposed rectangular field of view. The following part will describe the correspondence between the matrix spacing corresponding to the effective projection area and the layout of the rectangular field of view with reference to the related drawings.

FIG. 2b is an optical path diagram corresponding to an AR display device. In FIG. 2b, area 17 is a projection area obtained by projecting the virtual content displayed by the display screen 10 via the projection assembly 11. The effective display areas 101, 102, and 103 on the display screen 10 correspond to the effective projection areas 171, 172, and 173 on 17, respectively. The content of the effective projection area projected on to the retina 16 correspond to area 171', area 172', and area 173' shown in FIG. 2c, respectively. In FIG. 2b, since the micro mirror array 13 has preset matrix spacing, and the effective projection areas 171, 172, and 173 are connected, the superimposed circular field of view shown in FIG. 2c will be got on the retina 16. In some embodiments, the effective projection areas 171, 172, and 173 being connected means the effective projection areas 171, 172, and 173 are laying out side by side, and sharing no superimposed areas.

FIG. 2d is an optical path diagram corresponding to another AR display device. In FIG. 2d, 18 is the projection area obtained by the display screen 10 after through the projection assembly 11. The effective display areas 101 and 102 on the display screen 10 correspond to the effective projection areas 181 and 182 on the projection area 18, respectively. The contents of the effective projection area formed on the retina 16 correspond to 181' and 182' shown in FIG. 2e, respectively. In FIG. 2d, the effective projection areas 181 and 182 are distributed in a way of being not connected, and a spacing therebetween may be equal to the matrix spacing of the micro mirror array 13. Therefore, the imaging areas 181' and 182' on the retina of the human eye are circles are disconnected. Correspondingly, there may also be a preset spacing between the two effective display areas 101 and 102 on the display screen 10, and the spacing is limited by the optical parameter of the projection assembly 11.

In some embodiments, when the two effective projection areas 181 and 182 of the projection area 18 have a spacing equal to the matrix spacing of the micro mirror array 13, and the spacing is approximately equal to 4 mm, which is the average pupil diameter of the human eye, the imaging areas 181" and 182" on the retina of the human eye are tangent circles, as shown in FIG. 2f.

The corresponding relationship between the layout of the plurality of rectangular fields of view and the matrix spacing corresponding to the effective projection area may be: when the layout is the plurality of rectangular fields being superimposed, the matrix spacing corresponding to the plurality of effective projection areas obtained after projecting via the projection assembly is smaller than the matrix spacing of the micro mirror array; when the layout is the plurality of rectangular fields being disconnected, the matrix spacing corresponding to the plurality of effective projection areas obtained after projecting via the projection assembly is equal to a matrix spacing of the micro mirror array. In some embodiments, when the layout is the plurality of rectangular fields being connected, the matrix spacing corresponding to the plurality of effective projection areas obtained after projection via the projection assembly is equal to the matrix spacing of the micro mirror array, and the matrix spacing of the micro mirror array is 4 mm.

The following part will describe the method of how to determine a rectangular field of view according to the layout of plurality of rectangular fields of view and the matrix spacing corresponding to the plurality of effective projection areas in conjunction with FIG. 3a.

FIG. 3a is a method flowchart of an AR display method according to some embodiments of the present disclosure. With reference to FIG. 3a, the method includes:
  step 301: determining a matrix spacing corresponding to a plurality of effective projection areas obtained after projecting via a projection assembly, according to a layout of a plurality of rectangular fields of view;
  step 302: determining a matrix spacing of a plurality of effective display areas corresponding to the plurality of effective projection areas on a display screen, according to the matrix spacing corresponding to the plurality of effective projection areas and a scaling coefficient corresponding to the projection assembly;

step 303: determining a circular area corresponding to a field of view of each micro mirror unit in the micro mirror array on the display screen, according to an optical parameter of the micro mirror array;

step 304: determining a rectangular area in each of the circular area on the display screen, where a spacing between adjacent rectangular areas is equal to the matrix spacing of the effective display areas; and step 305: using the obtained plurality of rectangular areas as a plurality of effective display areas, and displaying a virtual content on the plurality of effective display areas to form a rectangular field of view at the human eye conforming to the layout.

For step 301, reference may be made to the records of the foregoing embodiments.

In step 302, the scaling coefficient corresponding to the projection assembly may be the magnification or reduction of the content formed by a projection system relative to the corresponding object. The coefficient may be calculated according to the optical parameter of the projection assembly.

After determining the matrix spacing corresponding to the plurality of effective projection areas, the matrix spacing of the effective display areas corresponding to the plurality of effective projection areas on the display screen may be calculated according to the scaling coefficient corresponding to the projection assembly.

In step 303, each micro mirror unit in the micro mirror array corresponds to one sub-field-of-view, and this sub-field-of-view corresponds to one circular area on the display screen. In some embodiments, an entirety of every sub-field-of-view of each micro mirror unit corresponds to the field of view of the micro mirror array. In some embodiments, regarding the shape of the area on the display screen corresponding to the field of view, the shape of the pupil of the human eye may be further taken in consideration. In some embodiments, the center and diameter of the circular area corresponding to the field of view of each micro mirror unit on the display screen may be calculated according to the optical parameter of the micro mirror array unit and the arrangement of the micro mirror array. The optical parameter of the micro mirror unit may include the field of view of the micro mirror unit and the distance from the micro mirror unit to the display screen.

In step 304, after determining the circular area corresponding to the field of view of each micro mirror unit on the display screen, a rectangular area may be determined in each circular area, and ensure that the spacing between the rectangular areas in adjacent two circular areas is equal to the matrix spacing between the effective display areas determined in the previous step.

In some embodiments, when one rectangular area is determined in each circular area, an inscribed rectangle may be determined in each circular area, and the area enclosed by the inscribed rectangle is used as an effective display area, as shown in FIG. 3b. FIG. 3b is a schematic diagram of an effective display area on the display screen. In FIG. 3b, the rectangle corresponding to the effective display area is inscribed in the circular area corresponding to the field of view of the micro mirror unit on the display screen. Regarding the plurality of circle areas, the spacing between the rectangular areas in the two adjacent circular areas is equal to the matrix spacing between the effective display areas determined in the previous step. When the inscribed rectangle is an inscribed square, the area corresponding to the field of view of each micro mirror unit on the display screen may be used maximally.

In step 305, after determining the effective display area, when the virtual content is displayed on the display screen, the virtual content may be displayed in the effective display area, and the virtual content is not displayed outside the effective display area. Thereby, the human eye may view the rectangular field of view through the AR display device, and the field of view conforms to the layout described in step 301. FIG. 3c and FIG. 3d show the rectangular field of view that may be generated at the human eye by the effective display area provided in FIG. 3b. FIG. 3c corresponds to the situation where the fields of view are superimposed, which conforms to the requirement that the layout is a rectangular field of view being superimposed. FIG. 3d corresponds to the situation where the fields of view are disconnected, which conforms to the requirement that the layout is a rectangular field of view being superimposed.

The embodiment corresponding to FIG. 3a describes how to make the AR display device display a virtual content in a rectangular field of view when the matrix spacing of the micro mirror array is determined. In addition to the effective display area, there may be many unused areas on the display screen. In order to use the display area of the display screen maximally, the present disclosure also provides some embodiments as showed in FIG. 4a. In the embodiment corresponding to FIG. 4a, a plurality of rectangular areas corresponding to the display area of the display screen at the maximum utilization may be determined first, and then the matrix spacing of the micro mirror array may be determined according to the positions of the plurality of rectangular areas. The following part will explain the above process with reference to FIG. 4a. As shown in FIG. 4a, the method includes:

step 401: determining a matrix spacing corresponding to a plurality of effective projection areas obtained after projecting via a projection assembly, according to a layout of a plurality of rectangular fields of view;

step 402: determining a matrix spacing of a plurality of effective display areas corresponding to the plurality of effective projection areas on a display screen, according to the matrix spacing corresponding to the plurality of effective projection areas and a scaling coefficient corresponding to the projection assembly;

step 403: calculating a length a' and a width b' of each effective display area when the display area of the display screen is at the maximum utilization, according to the length and width of the display screen and the numbers of row and the numbers of column of the micro mirror array;

step 404: determining a plurality of rectangular areas with a length of a' and a width b' on the display screen, and a pairwise spacing of y, as a plurality of effective display areas;

step 405: determining a circumscribed circle corresponding to each rectangular area of the plurality of rectangular areas as a circular area corresponding to the field of view of each micro mirror unit in the micro mirror array on the display screen, respectively;

step 406: determining the matrix spacing of the micro mirror array according to the circular area corresponding to the field of view of each micro mirror unit in the micro mirror array on the display screen and the optical parameter of the micro mirror array; and step 407: displaying a virtual content in the plurality of effective display areas to form a rectangular field of view at the human eye that conforms to the layout.

For the implementation of step 401 and step 402, reference may be made to the records in some of the foregoing embodiments.

In step 403, when the display area on the display screen is at the maximum utilization, the plurality of effective display areas and the matrix spacing of the plurality of effective display areas would make the entire display screen be completed filled. Assuming that the length and width of the display screen are a and b, respectively, and the matrix parameter of the micro mirror array is M×N, that is, the micro mirror array contains M micro mirror units in the length direction and N micro mirror units in the width direction, then a total length of the matrix spacing of the plurality of effective display area in lengthwise direction is y(M−1), and a total length of the effective display areas is obtained by subtracting the total length mentioned above from a length of the display screen a. When M effective display areas are included in the lengthwise direction, the length of each effective display area is a'=[a−y(M−1)]/M. Similarly, it can be obtained that when N effective display areas are included in the widthwise direction, the width of each effective display area is b'=[b−y(N−1)]/N.

The following part will explain this step in some embodiments in combination with an example. For example, three micro mirror units included in the micro mirror array correspond to three effective display areas. In the case of the maximum utilization of the display screen, the superimposing of the three effective display areas and the spacing between each effective display area makes the display just be right filled. At this time, the size of each effective display area on the display screen is about one-third of the total size of the display screen minus two spacing spaces. If the screen size is 16 mm×9 mm, and it is assumed that the 4 mm size corresponds to the size of 0.2 mm on display screen after projection according to scaling coefficient of the projection assembly, the three effective display areas correspond to the size of the display area on the screen is 5.2 mm×9 mm.

In step 405, after determining a circular area corresponding to a field of view of each micro mirror unit in the micro mirror array on the display screen, a circumscribed circle of each effective display area may be made, and each circumscribed circle may be used as the circle area corresponding to the field of view of corresponding micro mirror unit on the display screen, as shown in FIG. 4*b*. FIG. 4*b* illustrates a case where three effective display areas are included in the lengthwise direction and two effective display areas are included in the widthwise direction.

In step 406, after determining the circular area corresponding to the field of view of each micro mirror unit on the display screen, the matrix spacing of the micro mirror array may be determined according to the angle of view of each micro mirror unit and the distance from the display screen.

In step 407, after determining a plurality of effective display areas, when displaying the virtual content through the display screen, the virtual content may be displayed on the plurality of effective display areas, and the virtual content is not displayed outside the plurality of effective display areas. Thereby, the human eye may view the rectangular field of view through the AR display device, and the field of view conforms to the layout described in step 401. FIG. 4*c* and FIG. 4*d* illustrate a rectangular field of view that may be generated at the human eye by the effective display area provided in FIG. 4*b*. FIG. 4*c* corresponds to the situation where the fields of view are superimposed, which conforms to the requirement that the layout is a rectangular field of view being superimposed. FIG. 4*d* corresponds to the situation where the fields of view are disconnected, which conforms to the requirement that the layout is a rectangular field of view being superimposed.

In the present disclosure, after determining the corresponding rectangular area when the display area of the display screen reaches the maximum utilization, the matrix spacing of the micro mirror array is determined according to the position of the rectangular area, so that while allowing the wearer to view the rectangular field of view, the display area of the display being in maximum utilization is ensured.

As shown in FIG. 5, in reality, the AR display method may be implemented by an AR display apparatus. As shown in FIG. 5, the AR display apparatus may include: a memory 501, and a processor 502.

The memory 501 and the processor 502 may be connected through a bus or other means. In FIG. 5, a bus connection is used as an example.

The memory 501 is used to store one or more computer instructions, and may be configured to store various other data to support operations on the AR display apparatus. Examples of these data include instructions for any application or method for being operated on the AR display apparatus.

The memory 501 may be implemented by any type of volatile or non-volatile storage device or a combination thereof, such as static random access memory (SRAM for short), electrically erasable programmable read only memory (EEPROM for short), erasable and removable programmable read only memory (EPROM for short), programmable read only memory (PROM for short), read only memory (ROM for short), magnetic memory, flash memory, magnetic disk or optical disk.

In some embodiments, the memory 501 may include a memory remotely set with respect to the processor 502, and these remote memories may be connected to a background service control apparatus through a network. Examples of the above network include but are not limited to the Internet, intranet, local area network, mobile communication network, and combinations thereof.

The processor 502, coupled to the memory 501, is used to execute the one or more computer instructions for:
  determining a matrix spacing corresponding to a plurality of effective projection areas obtained after projecting via a projection assembly, according to a layout of a plurality of rectangular fields of view;
  determining a matrix spacing of a plurality of effective display areas corresponding to the plurality of effective projection areas on a display screen, according to the matrix spacing corresponding to the plurality of effective projection areas and a scaling coefficient corresponding to the projection assembly;
  determining a plurality of rectangular areas corresponding to a field of view of a micro mirror array on the display screen, according to the matrix spacing of a plurality of effective display areas, as the plurality of effective projection areas; and
  displaying a virtual content in the plurality of effective display areas to form a rectangular field of view conforming the layout at a human eye.

In some embodiments, the layout of the plurality of rectangular fields of view includes: the plurality of rectangular fields being disconnected or the plurality of rectangular fields being superimposed; the processor is specifically configured for: when the layout is the plurality of rectangular fields being disconnected, determining that the matrix spacing corresponding to the plurality of effective projection areas obtained after projecting via the projection assembly is equal to a matrix spacing of the micro mirror array; or, when the layout is the plurality of rectangular fields being superimposed, determining that the matrix spacing corresponding to the plurality of effective projection areas obtained after projecting via the projection assembly is less than the matrix spacing of the micro mirror array.

In some embodiments, the matrix spacing of the micro mirror array is 4 mm.

In some embodiments, the processor 502 is configured for: determining a circular area corresponding to a field of view of each micro mirror unit in the micro mirror array on the display screen, according to an optical parameter of the micro mirror array; and determining a rectangular area in each of the circular area on the display screen, wherein a spacing between adjacent rectangular areas is equal to the matrix spacing of the effective display areas.

In some embodiments, the rectangular area determined in each of the circular area is inscribed in the circular area.

In some embodiments, the processor 502 is configured for: determining a plurality of rectangular areas on the display screen with a length of $a'=[a-y(M-1)]/M$, a width of $b'=[b-y(N-1)]/N$, and a pairwise spacing of y, as the plurality of effective display areas; where, a and b are a length and a width of the display screen, respectively, $a' \in (0, a]$, $b' \in (0, b]$, y is the matrix spacing of the plurality of effective display areas, $y \prec \max(a, b)$, and M is numbers of row of the micro mirror array, and N is numbers of column of the micro mirror array.

In some embodiments, the processor 502 is configured for: determining a circumscribed circle corresponding to each rectangular area in the plurality of rectangular areas, as the circular area corresponding to the field of view of each micro mirror unit in the micro mirror array on the display screen, respectively; and determining the matrix spacing of the micro mirror array, according to the circular area corresponding to the field of view of each micro mirror unit in the micro mirror array on the display screen and the optical parameter of the micro mirror array.

The AR display apparatus may include: a power supply component 505. The power supply component 505 provides power to various components of the apparatus where the power supply component is located. The power supply component may include a power management system, one or more power supplies, and other components associated with generating, managing, and distributing power for the equipment where the power supply component is located.

The above-mentioned AR display apparatus may execute the AR display method provided by the embodiments of the present application, and has functional modules and beneficial effects corresponding to the execution method. For technical details that are not described in detail in the present embodiment, reference may be made to the method provided in the present embodiment of the present application, and details are not described herein.

In the present disclosure, according to the layout of the rectangular field of view, after determining the matrix spacing corresponding to the plurality of effective projection areas obtained by projecting via the projection assembly, the rectangular area for displaying virtual content is determined on the display screen based on the matrix spacing and the scaling coefficient corresponding to the projection assembly, and the virtual content is displayed in this rectangular area. Thereby, the wearer can view a virtual content displayed in a rectangular field of view through an AR display apparatus based on a micro mirror array.

In some embodiments, the AR display device provided in the present disclosure may be monocular or binocular. As shown in FIG. 6, there are two separated AR display devices 61 and two frames 62 used for fixing and making the AR display device 61 easy to wear. The AR display device 61 is shown in the embodiments corresponding to above drawings.

When the AR display device is binocular, the AR display device includes a left-eye AR display device and a right-eye AR display device as shown. The frames 62 includes: an adjustable connection mechanism 63 for connecting the left-eye AR display device and the right-eye AR display device and a temple 64, etc.

The adjustable connection mechanism 63 may adjust the distance between the two AR display devices of the left and right eyes according to the size of the pupillary distance of the wearer by pulling or rotating, so that the AR display device may be adapted to wearers with different pupillary distances.

Above mentioned embodiments are not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. An AR display device, comprising:
   a display assembly, an optical assembly, and a micro mirror array coupled to the optical assembly;
   wherein:
   the display assembly comprises a display screen, and the display screen comprises a plurality of effective display areas for displaying a virtual content;
   the micro mirror array comprises a plurality of micro mirror units;
   the micro mirror array is located on a propagation path of light emitted from the display assembly;
   the micro mirror array receives the light emitted from the display assembly, then reflects the light forward the eye of a wearer;
   a matrix parameter of the plurality of effective display areas on the display screen is the same as a matrix parameter of the micro mirror array, and each effective display area is located within a circular area on the display screen corresponding to a field of view of a corresponding micro mirror unit in the micro mirror array, respectively;
   the display assembly further comprises a projection assembly, and the projection assembly is located between the display screen and the micro mirror array; and
   a scaling coefficient of the projection assembly satisfies that a matrix spacing corresponding to a plurality of effective projection areas after being projected via the projection assembly is less than or equal to a matrix spacing of the micro mirror array.

2. The device according to claim 1, the optical assembly comprises: a first lens and a second lens that are cemented; and the micro mirror array is disposed on a cemented interface between the first lens and the second lens, and a reflection surface of the micro mirror array is close to the human eye.

3. The device according to claim 2, the plurality of micro mirror units comprises:
   a plurality of micro mirrors or a plurality of micro reflection films attached to the cemented interface according to the matrix parameter and a matrix spacing, or a microstructure etched on the cemented interface and coated with a reflection film.

4. The device according to claim 3, an aperture of the micro mirrors, the micro reflection films or the microstructure is 100 μm-2 mm.

5. The device according to claim 2, an angle between the cemented interface and a front surface on the first lens close to the human eye is an acute angle;
the display assembly is disposed outside an end of the first lens, the light emitted from the display assembly is incident on the micro mirror array through the end of the first lens, and is reflected toward the human eyes through the micro mirror array.

6. The device according to claim 5, the end surface of the first lens is perpendicular to a rear surface on the first lens away from the human eye and the front surface, and a light emitting surface of the display assembly is parallel to the end of the first lens; the light emitted from the display assembly reaches the micro mirror array through the end of the first lens, and is reflected toward the human eye through the micro mirror array; or,
the end of the first lens is inclined at an acute angle to the rear surface or the front surface of the first lens, and the light emitting surface of the display assembly is parallel to the end surface of the first lens; and the light emitted from the display assembly passes through the end face of the first lens, is transmitted in the first lens in a total reflection manner, reaches the micro mirror array, and is reflected toward the human eye through the micro mirror array.

7. The device according to claim 2, wherein the first lens and the second lens are cemented in a direction along a line connecting a left eye and a right eye; or, the first lens and the second lens are cemented in a direction perpendicular to the line connecting the left eye and the right eye.

8. The device according to claim 1, further comprising a frame used for fixing and making the AR display device easy to wear.

9. The device according to claim 8, wherein the device comprises a left-eye AR display device and a right-eye AR display device; and
the frame comprises: an adjustable connection mechanism used for connecting the left-eye AR display device and the right of eye AR display device.

10. The device according to claim 1, the plurality of micro mirror units are attached to the cemented interface according to a matrix parameter and a matrix spacing, or a microstructure etched on the cemented interface and coated with a reflection film.

11. An AR display method, comprising:
determining a matrix spacing of a plurality of effective projection areas after being projected via a projection assembly, according to a layout of a plurality of rectangular fields of view;
determining a matrix spacing of a plurality of effective display areas corresponding to the plurality of effective projection areas on a display screen, according to the matrix spacing corresponding to the plurality of effective projection areas and a scaling coefficient corresponding to the projection assembly;
determining a plurality of rectangular areas corresponding to a field of view of a micro mirror array on the display screen, according to the matrix spacing of a plurality of effective display areas, as the plurality of effective display areas; and
displaying a virtual content in the plurality of effective display areas;
wherein the layout of the plurality of rectangular fields of view comprises: the plurality of rectangular fields being disconnected or the plurality of rectangular fields being superimposed;
the determining the matrix spacing of the plurality of effective projection areas after being projected via the projection assembly, according to the layout of the plurality of rectangular fields of view, comprises:
when the layout is the plurality of rectangular fields being disconnected, determining that the matrix spacing corresponding to the plurality of effective projection areas obtained after projecting via the projection assembly is equal to a matrix spacing of the micro mirror array; or,
when the layout is the plurality of rectangular fields being superimposed, determining that the matrix spacing corresponding to the plurality of effective projection areas obtained after projecting via the projection assembly is less than the matrix spacing of the micro mirror array.

12. The method according to claim 11, wherein the matrix spacing of the micro mirror array is 4 mm.

13. The method according to claim 11, wherein the determining the plurality of rectangular areas corresponding to the field of view of the micro mirror array on the display screen, according to the matrix spacing of the plurality of effective display areas, comprises:
determining a circular area corresponding to a field of view of each micro mirror unit in the micro mirror array on the display screen, according to an optical parameter of the micro mirror array; and
determining a rectangular area in each of the circular area on the display screen, wherein a spacing between adjacent rectangular areas is equal to the matrix spacing of the effective display areas.

14. The method according to claim 13, wherein the rectangular area determined in each of the circular area is inscribed in the circular area.

15. The method according to claim 11, wherein the determining the plurality of rectangular areas corresponding to the field of view of the micro mirror array on the display screen, according to the matrix spacing of the plurality of effective display areas, as the plurality of effective projection areas, comprises:
determining a plurality of rectangular areas on the display screen with a length of $a'=[a-y(M-1)]/M$, a width of $b'=[b-y(N-1)]/N$, and a pairwise spacing of y, as the plurality of effective display areas;
wherein, a is a length of the display screen, b is a width of the display screen, $a' \in (0, a]$, $b' \in (0, b]$, y is the matrix spacing of the plurality of effective display areas, $y < \max(a,b)$, and M is numbers of row of the micro mirror array, and N is numbers of column of the micro mirror array.

16. The method according to claim 15, wherein after the determining the plurality of rectangular areas on the display screen with the length of $a'=[a-y(M-1)]/M$, the width of $b'=[b-y(N-1)]/N$, and the pairwise spacing of y, as the plurality of effective display areas, further comprises:
determining a circumscribed circle corresponding to each rectangular area in the plurality of rectangular areas, as the circular area corresponding to the field of view of each micro mirror unit in the micro mirror array on the display screen, respectively; and
determining the matrix spacing of the micro mirror array, according to the circular area corresponding to the field of view of each micro mirror unit in the micro mirror array on the display screen and the optical parameter of the micro mirror array.

17. An AR display apparatus, comprising: a memory and a processor;
   the memory is used to store one or more computer instructions;
   the processor is used to execute the one or more computer instructions for:
   determining a matrix spacing of a plurality of effective projection areas after being projected via a projection assembly, according to a layout of a plurality of rectangular fields of view;
   determining a matrix spacing of a plurality of effective display areas corresponding to the plurality of effective projection areas on a display screen, according to the matrix spacing corresponding to the plurality of effective projection areas and a scaling coefficient corresponding to the projection assembly;
   determining a plurality of rectangular areas corresponding to a field of view of a micro mirror array on the display screen, according to the matrix spacing of a plurality of effective display areas, as the plurality of effective display areas; and
   displaying a virtual content in the plurality of effective display areas;
   wherein the layout of the plurality of rectangular fields of view comprises: the plurality of rectangular fields being disconnected or the plurality of rectangular fields being superimposed;
   the determining the matrix spacing of the plurality of effective projection areas after being projected via the projection assembly, according to the layout of the plurality of rectangular fields of view, comprises:
   when the layout is the plurality of rectangular fields being disconnected, determining that the matrix spacing corresponding to the plurality of effective projection areas determined after projecting via the projection assembly is equal to a matrix spacing of the micro mirror array; or,
   when the layout is the plurality of rectangular fields being superimposed, determining that the matrix spacing corresponding to the plurality of effective projection areas determined after projecting via the projection assembly is less than the matrix spacing of the micro mirror array.

* * * * *